United States Patent [19]

Shellhause

[11] 3,802,118

[45] Apr. 9, 1974

[54] MODEL AIRPLANE CONTROL LINE LOAD REGULATING SYSTEM

[76] Inventor: Ronald Louis Shellhause, 519 Bennert Dr., Vandalia, Ohio 45377

[22] Filed: Apr. 23, 1973

[21] Appl. No.: 353,555

[52] U.S. Cl. .......... 46/77, 272/31
[51] Int. Cl. .......... A63h 27/04
[58] Field of Search .......... 46/76–78, 243 AV; 272/31 A

[56] References Cited

UNITED STATES PATENTS

| | | | |
|---|---|---|---|
| 2,616,214 | 11/1952 | Hydrick | 46/77 |
| 2,624,152 | 1/1953 | Sneed | 46/77 |
| 2,849,833 | 9/1958 | Mills | 46/77 |
| 3,391,484 | 7/1968 | Darin | 46/77 |

*Primary Examiner*—Robert Peshock
*Assistant Examiner*—Robert F. Cutting

[57] ABSTRACT

A control line load regulating system for model airplanes that employs low friction elements to vary the rudder position, thereby maintaining line load to a pre-set value within the capability of the rudder. The system includes a one-way directional damper to correct delayed control excess encountered on takeoff and to manage gust wind conditions.

5 Claims, 4 Drawing Figures

MODEL AIRPLANE CONTROL LINE LOAD REGULATING SYSTEM

This invention relates to a model airplane control line load regulating system that forces the rudder of the craft to constantly re-set its position to maintain a preset load value within the system.

The surface area and air foil efficiency of the rudder, together with the speed of the craft, establish the capability of the rudder to attain the desired in-flight control line load set within the regulating system.

It is a function of this invention to suitably match all craft rudder variables without a change of the regulating system except in the initial and normal setting of the control line load as will be later described.

It is also a function of this invention to provide a one-way damping action. On "take off" of the craft, the rudder is in the full outward position and the craft quickly reaches normal flight speed. At normal speed, in level flight, the rudder position would be turned inward slightly. This sudden change in rudder position on "take off," involving the removal of line slack with air speed, combined with normal rudder response delay, requires damping action to prevent delayed excess control regulation. Without damping, the craft establishes a type of diminishing "sine wave"-horizontal flight path, gradually settling to stable regulated flight. The one-way damping acts only in the direction of inward rudder movement, toward the center of the flight circle, for gust wind conditions require immediate outward rudder movement to maximize craft regulation.

It is also a function of this invention to regulate the damping action on a diminishing scale so that normal flight maneuvers have little or no damping. Only rapid action is damped, limiting inward full rudder movement to a timed transition.

In normal horizontal flight, the rudder is turned inward slightly, as previously described. As the craft climbs, the rudder gradually turns outward until, at the top of the flight path, it is turned to the full outward position. This tends to keep the slack out of the control lines, thus improving the manageability of the present elevator control art. A further normal flight condition is that of landing the craft after the engine runs out of fuel. With the present elevator control art, it is frequently necessary to bring the craft to an abrupt landing or move backward to keep the slack out of the control lines. The regulating rudder system of this disclosure removes line slack for an extended time period, allowing additional glide length, thus improving landing conditions. IN THE DRAWINGS FIG. 1 is a trimetric view, with parts broken away and in section, showing a control line load regulating system embodying the invention and a present art elevator bell crank control installed in a model airplane.

Figures 1, 2:
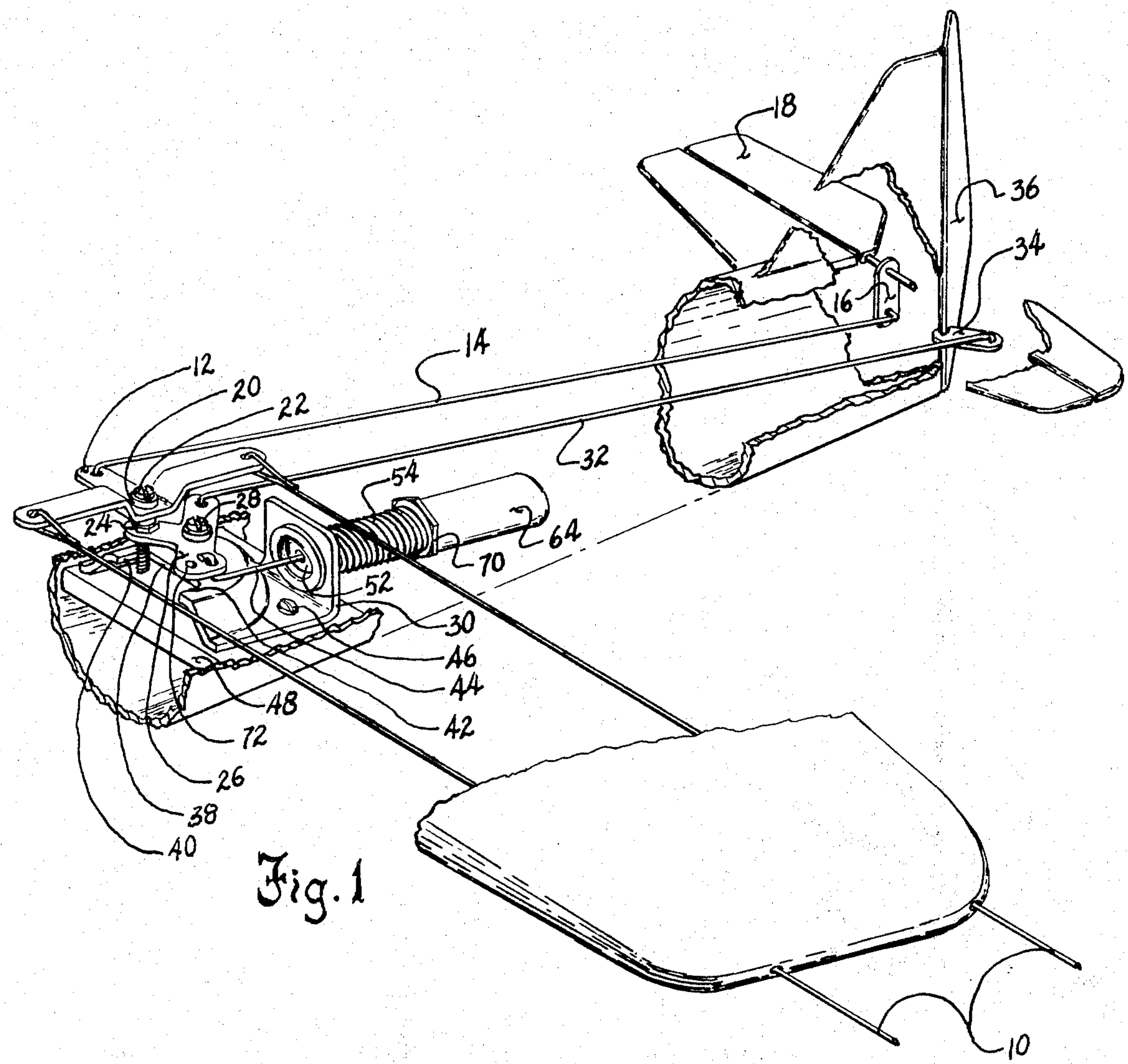
FIG. 2 is an enlarged sectional trimetric view of the adjustable load one-way damper of FIG. 1.

With reference to FIG. 1, control lines 10 are shown broken, but normally extend to each end of the typical operator's control handle. These control lines are fastened to the elevator bell crank 12. The elevator bell crank is pivotally linked with the elevator push rod 14, which is in turn pivotally linked to the elevator control arm 16 that is fastened to the elevator 18. This elevator control system shown represents the present elevator control art.

The elevator bell crank is pivotally held in a bushing 20 which, in turn, is located by the bell crank fulcrum screw 22. The proper load in the control lines, one that is adequate to remove slack, is carried by the bell crank. This load is totally transferred from the bushing to the elevator bell crank fulcrum screw which is held by lock nut 24 in a firm position with the rudder bell crank 26.

The load on the elevator bell crank fulcrum screw pivotally actuates the rudder bell crank about its bushing and fulcrum screw 28. The rudder bell crank fulcrum screw is held in a firm position to the base 30 by a lock nut hidden from view under the rudder bell crank. This lock nut is used in a manner similar to lock nut 24. The rudder bell crank is also pivotally linked to the rudder push rod 32 which is in turn pivotally linked to the rudder control arm 34 fastened to the rudder 36.

The elevator bell crank fulcrum screw 22 is shown extending downward thru a notch 38 formed in the left end of the base 30. The sides 40 and 42 of this notch form stops which limit the full travel of the rudder when engaged by the screw.

The damper push rod 44 pivotally engaging the rudder bell crank 26 delivers a preset regulating force to the rudder bell crank. This regulating force, operating through the lever ratio of the rudder bell crank 26, establishes the control line load at which movement of the rudder bell crank will occur. The rudder bell crank 26 then constantly seeks to position the rudder 36 to cause the craft to maintain the preset control line load.

The entire control line load regulating assembly is shown mounted by the base 30 with screws 46, one of which is hidden from view on the opposite side, to a platform 48 within the craft.

With particular reference now to FIG. 2, an enlarged sectional view shows the damper and regulating spring assembly of FIG. 1. The damper push rod hole 50 provides a suitable pocket or recess for the end of rod 44 in the damper piston 52. The damper piston 52 is slidably located in the externally threaded damper cylinder 54 and contains a shaped annular groove receiving the O-ring seal 56. The shaped annular groove on the damper piston is flared on the left shoulder 58 to force the O-ring into firm mating contact with damper cylinder bore when the piston is moved deeper within the cylinder. The diameter of the base surface 60 of the annular groove is smaller than the inside diameter of the O-ring 56. This clearance together with a flat 62 on the inner flange of the damper piston provides an air inlet passage. This passage allows outside air entering at the damper piston-to-bore clearance to pass into the cylinder when the piston is moved in an outward direction. The O-ring 56, placed in the annular groove, thus becomes a compression seal with inward piston motion and a vent valve with outward piston motion. The internally threaded adjustor cap 64 forms a compression chamber closure. The damping orifice 66 in the closed end of the adjustor cap establishes the damping rate on inward piston compression movement. On outward piston movement, the O-ring vent valve function bypasses the damping action, allowing rapid outward trim of the rudder.

The load of spring 68 is set by the adjustor cap and locked by the jam nut 70. In practice, the adjustor cap is turned to increase the spring load on spring 68 until the rudder begins inward movement at the point that control line slack is removed. This adjustment accomodates a broad range of control line weights and is made prior to flight of the craft. The maximum spring load necessary for the heaviest control lines requires a higher spring rate to maintain proper stress levels with the spring. To offset this load-rate increase, the rudder bell crank 26, shown in FIG. 1, provides a changing-increasing mechanical advantage as it moves to push the damper push rod 44 into the damper and regulating spring assembly.

The unused hole 72 in the rudder bell crank 26 allows inverted installation of the entire regulating assembly wherein the rudder push rod 32 would be relocated. The rudder 36 is normally turned inward when high speeds of the craft are attained at level flight conditions. The rudder push rod 32 can be of a smaller diameter and, hence, lighter if placed in tension under these high speed conditions. By connecting the rudder push rod 32 in the inverted installation hole 72, the puah rod 32 is placed in tension during level flight high speed conditions.

Figure 3:
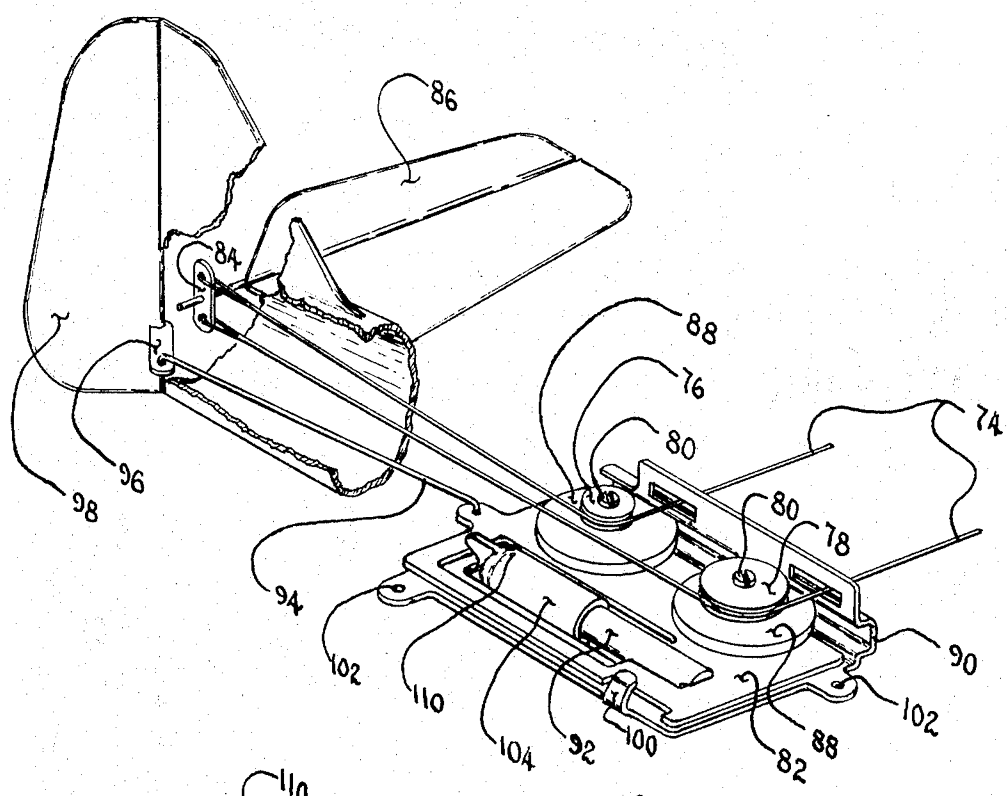
FIG. 3 is a trimetric view, with parts broken away and in section, of a modification of the mechanism of FIG. 1, showing a control line load regulating system and a roller-elevator control system embodying the invention.

With reference now to FIG. 3, control lines 74 are shown entering another form of the control line load regulating assembly particularly suited to very small model airplane craft. The control lines used with these smaller craft are made of extremely flexible filament and are normally tied to the present art elevator bell crank. This disclosure shows an improved routing of the control lines that eliminates the elevator bell crank and takes up all lost motion due to clearance fits of the elevator control components. The control lines respectively pass around pulleys 76 and 78 which are pivotally held by like screws 80. These screws 80 are mounted in the moveable base 82, thus providing fixed centers for the pulleys 76 and 78 within the moveable base. After passing around the pulleys, the control lines are tied to the double ended elevator control arm 84 which is fastened to the elevator 86. Two identical rollers 88 are also pivotally held by the like screws 80. These rollers are held in a track formed from the fixed base 90. The control line load is transferred from the respective pulleys to the screws 80 and thence to the moveable base 82 in an axial direction parallel to the center axis of the craft. The damping piston 92 delivers a pre-established regulating force to the moveable base 82. This regulating force establishes the control line load at which travel of the moveable base 82 will occur. The moveable base is linked to the rudder push rod 94 which is in turn linked with the rudder control arm 96 fixed to the rudder 98. The moveable base 82 then constantly seeks to position the rudder 98 to cause the craft to maintain a pre-set control line load. The identical tracked rollers 88 serve as a low friction medium allowing ease of travel of the moveable base. The rudder push rod 94 in FIG. 3 could be in compression when the craft is at high speed in horizontal flight and must be made large enough to resist buckling. The full travel of the rudder is limited by a tab stop 100, which is formed from the fixed base 90. The two holes 102, shown in the fixed base are to be used for mounting screws to fasten the entire control line load regulating assembly to a platform within the craft as is more suitably shown in FIG. 1.

Figure 4:
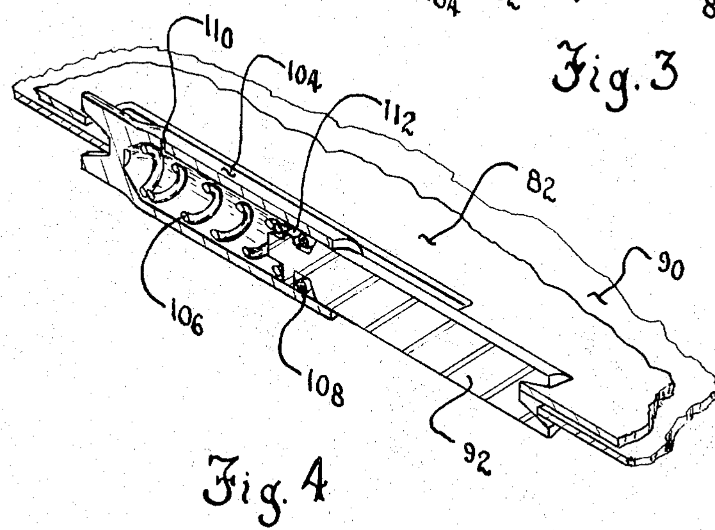
FIG. 4 is an enlarged sectional trimetric view of the fixed load one-way directional damper of FIG. 3.

With particular reference now to FIG. 4, an enlarged sectional view shows the damper and fixed load regulating spring assembly installed between the moveable base 82 and the fixed base 90. The damping piston 92 and damping cylinder 104 are suitably notched to locate on each of the bases. The bases 82 and 90, are also suitably notched to allow relative movement in which the damping piston 92 may deliver the force regulated by the spring 106 and the damping action to the moveable base 82. The damping action occurs during inward motion of the damping piston which forces the O-ring 108 to form a compression seal against the bore of the damping cylinder 104. The damping orifice 110 establishes the rate of damping action. The flat 112, on the piston flange next to the shaped annular O-ring groove provides a valving function on outward movement of the damping piston 92. This valving function permits a quick release of the damping action and allows rapid outward trim of the rudder, all of which is accomplished in a manner similarly described for FIG. 2.

Other damping arrangements, such as frictional devices, will work. The devices shown in this disclosure, however, have proven to be the most stable in performance.

What is claimed is:

1. A model airplane control line tension regulating mechanism for use in a model airplane having a fuselage and a pair of control lines and rudder and elevator control surfaces and control arms, said mechanism comprising:

a base plate fixed to the fuselage and having a flanged section formed thereon and a mounting platform section, a rudder bell crank pivotally mounted on said platform section and having one end and a pair of opposed ends angularly spaced about the crank pivot, a variable load regulator mounted on said flange section and having a moveable output member, a first push rod pivotally linking said regulator output member and one end of said rudder bell crank opposed ends to transmit forces there between, a second push rod pivotally linking the other of said rudder bell crank opposed ends and the rudder control surface control arm to transmit forces there between;

an elevator bell crank pivotally mounted on said rudder bell crank one end and having means connecting it to said elevator surface control arm in force transmitting relation;

the pair of control lines being connected to said elevator bell crank for operation in tension to control the elevator surface and exert a pivotal force on said rudder bell crank tending to move the rudder to maintain substantially constant tension on the control lines subject to modification by said variable load regulator.

2. The mechanism of claim 1 in which said rudder bell crank and said opposed end thereof having the first push rod pivotally linked therein is positioned in a relationship with said first push rod to provide increasing mechanical advantage to substantially match load-rate increases of said variable load regulator.

3. The mechanism of claim 1 in which said rudder bell crank and said opposed ends thereof having said pivotally linked first and second push rods therein are provided with a one way damper acting upon said regulator output member and said transmitted forces in a manner allowing rapid outward movement of said rudder control surface and slowing inward movement of said rudder control surface.

4. A model airplane control line tension regulating mechanism for use in a model airplane having a pair of control lines and a fuselage and rudder and elevator control surfaces and control arms said mechanism comprising:

a first base plate fixed to the fuselage and having a flanged guide track formed thereon and having a travel limiting stop formed thereon, a second base plate moveable relative to the first base plate and having two fixed centers mounted thereon and having a notch receiving said travel limiting stop, a fixed load regulator mounted between said first base plate and said second base plate to transmit regulating load there between;

a separate roller pivotally mounted to each of the said two fixed centers of said second base plate and each said roller engaging said flanged guide track of said first base plate to provide low friction elements for relative movement of the said second base plate to the said first base plate;

a separate pulley pivotally mounted to each of the said two fixed centers of said second base plate and each said pulley receiving and re-directing one of each of the said pair of control lines to each end of a double ended elevator surface control arm;

the said pair of control lines being operated in tension to control the elevator surface and exerting a directional force on said pulleys and thereto said fixed centers tending to produce said relative movement acting through said push rod to move the rudder to maintain substantially constant tension on the control lines as limited by said fixed load regulator.

5. The mechanism of claim 4 in which said first base and said second base are provided with a one way damper acting there between and acting upon said directional force in a manner allowing rapid outward movement of said rudder control surface and slowing inward movement of said rudder control surface.

* * * * *